United States Patent [19]

Backstrand

[11] Patent Number: 5,319,292
[45] Date of Patent: Jun. 7, 1994

[54] METHOD AND APPARATUS FOR PREVENTING MOTORING WHILE BRAKING

[75] Inventor: Jon E. Backstrand, Oak Creek, Wis.

[73] Assignee: Harnischfeger Corporation, Milwaukee, Wis.

[21] Appl. No.: 904,983

[22] Filed: Jun. 26, 1992

[51] Int. Cl.[5] .................................... F16D 65/36
[52] U.S. Cl. ...................... 318/371; 303/3; 188/156
[58] Field of Search ............. 318/139, 362, 370, 371, 318/372, 375, 376, 377, 378, 379, 380; 303/2, 3; 188/156, 157, 158, 159, 160

[56] References Cited

U.S. PATENT DOCUMENTS

| | | | |
|---|---|---|---|
| 3,621,929 | 11/1971 | Oberthur | 318/371 X |
| 3,726,417 | 4/1973 | Nephew | |
| 3,731,168 | 5/1973 | Strifler | 318/139 |
| 3,845,366 | 10/1974 | Metzler et al. | 318/99 |
| 4,097,785 | 6/1978 | Sato et al. | 318/89 |
| 4,166,238 | 8/1979 | Binner | 318/67 |
| 4,181,366 | 1/1980 | Dobner | |
| 4,392,098 | 7/1983 | Min | 318/758 |
| 4,408,281 | 10/1983 | Tack, Jr. et al. | 364/476 |
| 4,417,288 | 11/1983 | Hattori et al. | 318/371 X |
| 4,671,577 | 6/1987 | Woods | 318/372 X |
| 4,900,992 | 2/1990 | Sekizawa et al. | 318/135 |
| 4,962,969 | 10/1990 | Davis | 318/371 X |
| 4,965,847 | 10/1990 | Jurkowski et al. | 388/814 |
| 5,061,883 | 10/1991 | Asano et al. | 318/362 |
| 5,077,508 | 12/1991 | Wycoff et al. | 318/436 |

*Primary Examiner*—Bentsu Ro
*Attorney, Agent, or Firm*—Jansson & Shupe, Ltd.

[57] ABSTRACT

The inventive method and machine are improvements in aspects of a material handling machine (such as an overhead travelling crane) having an electrically-powered traverse drive, e.g., a bridge drive. Such machine has (a) regenerative motor braking and (b) a manually-applied hydraulic brake, both for retarding the machine. The invention prevents the bridge drive motor from "driving through the brake" when the hydraulic brake is being applied to result in significant retarding torque. When the hydraulic brake is pedal-applied, an electrical contact closes at a predetermined hydraulic pressure and other devices, relays and the like, are actuated to modify operation of the controller and prevent "motoring" simultaneous with hydraulic braking. Regenerative braking is likely to be set for a retardation rate less than results from application of the hydraulic brake. The invention prevents the drive motor and hydraulic braking system from "fighting." With the invention, the motor control unit is disabled at some predetermined pressure in the brake hydraulic line. Thereafter, the machine is retarded solely by application of the manually-operated brake until the machine reaches a very slow speed.

16 Claims, 8 Drawing Sheets

METHOD AND APPARATUS FOR PREVENTING MOTORING WHILE BRAKING

FIELD OF THE INVENTION

This invention relates generally to material handling machines and, more particularly, to braking systems for such machines.

BACKGROUND OF THE INVENTION

Certain types of material handling machines incorporate electric drive systems for moving the machine from location to location and/or for moving a machine "substructure" on the machine itself. An example of such a material handling machine is an overhead travelling crane (OTC) used in factories, steel handling bays or the like for lifting and placing loads. Such a crane traverses along a pair of elevated main rails which are parallel and spaced apart, usually by several yards. A pair of bridge girders extends between the rails and there are driven wheels mounted at either end of the girders for riding atop the rails. And the girders themselves have rails on them.

A substructure called a "trolley" is mounted on the girder rails and traverses the width of the bridge under motive power. A load hoist is mounted on the trolley and includes a powered hoist/lower "rope drum" or drums about which steel cable is spirally wrapped. The cable is connected to a load-lifting hook, sling, bucket, magnet or the like. With the foregoing arrangement, the operator (who usually rides in a cab which is attached to and moves with the bridge) can pick up, move and deposit a load anywhere in the area travelled by the crane. Other, somewhat less common operating options include radio-controlled cranes operable from the ground or other remote location and operator cabs which are trolley, rather than bridge, mounted.

Another, similar type of crane is called a straddle crane and many of its operating principles are similar to those of an OTC. A difference is that the main rails are near ground level and the bridge and trolley are supported at an elevation by legs extending between the bridge girders and the main rails. A straddle crane resembles an inverted letter "U" in shape.

And there are yet other types of OTCs. One is often called a half-straddle or half-gantry crane in that one end of the crane bridge is supported by an elevated rail while the other is supported by a downwardly-extending leg, the steel rail-car-like wheels of which ride atop a parallel rail near ground level.

An exemplary overhead crane employs two electric-motor traverse drive systems, one each for the bridge and trolley traverse drives. A third electric-motor drive system is used for hoisting and lowering loads. Such drive systems may be powered by direct current (DC) or alternating current (AC). While DC drive systems were almost universally used in older steel mills and the like, AC variable frequency drive systems are becoming increasingly common, at least in part because of the advantages of precision control and design flexibility which they offer. In a variable frequency drive system, motor speed is a function of the frequency of the electrical voltage applied to it. Examples of AC variable frequency drive systems (used for hoist drives) are described in U.S. Pat. Nos. 4,965,847 (Jurkowski et al.) and 5,077,508 (Wycoff et al.). The leading manufacturer of overhead cranes and AC drive systems therefor is Harnischfeger Industries, Inc. of Milwaukee, Wis. One such AC drive system is sold under the trademark SMARTORQUE® and the invention involves a modification of a known type of SMARTORQUE® controller.

Even with no load on the hoist, bridges and trolleys of overhead cranes are very heavy. And with a crane-suspended load, the total weight can be much greater. Overhead cranes are designed to lift loads ranging from a few tons to well over one hundred tons. And it should be appreciated that unlike the relatively flexible tires of an automobile on a hard-surface road, steel wheels running on steel rails provide very little resistance to rolling, i.e., very little slow-down effect. Clearly, the crane operator must be provided the ability to retard and stop bridge or trolley motion in a controlled manner.

To that end, AC drive systems are often provided with a feature called "regenerative braking." With regenerative braking, the kinetic energy of the moving bridge or trolley is dissipated in a large resistor bank as heat or is "pumped back into" the AC power line. In either instance, the effect is to retard the bridge or trolley traverse drive (and, thus, the bridge or trolley itself) at a rate much more rapid than would occur simply by letting the bridge or trolley coast to a stop. And when a crane is turned off (at the end of a shift, for example), spring-set brakes prevent drive motor rotation. Such brakes are electrically released but also include a controlled-braking capability. That is, the crane operator can apply the brake in a way much like automobile brakes are applied.

Bridge and trolley traverse drives are operated by an electrical controller coupled to an operator-manipulated master switch in the cab. Such master switch has a handle with a neutral position and a series of positions in either of two directions from neutral. The handle thus controls drive speed in either of two directions. And the farther the handle is moved away from the neutral position, the faster the traverse drive moves the bridge or trolley.

Regenerative braking occurs whenever the actual speed of the traverse drive is greater than the speed then "set" by the master switch handle. And in that event, the electric motor and controller "ramp down" or decelerate the speed of the bridge or trolley traverse drive to the set speed. The quoted expression derives its name from the fact that when depicted on a two-axis graph, the line representing rate of deceleration slopes and is therefore ramp-like in shape. Usually, the control manufacture sets such rate—it is not changed in day-to-day crane operations.

Regenerative braking is not the only means available to retard bridge and trolley motion. Usually, an electrohydraulic brake (as described above) is coupled to each of the crane bridge and trolley traverse motors. As with an automobile, the operator can depress a foot pedal in the cab and brake the traverse drive at a rate selected by pedal foot pressure. And sometimes (indeed, very often in certain types of material handling operations) the operator must retard the traverse drive and brake it to a stop in a much shorter time than would result from the use of regenerative braking alone. It might be said that the operator needs a rate of deceleration with a steeper slope.

However, the provision of redundant retarding capabilities (by regenerative and foot-pedal braking) has resulted in some traverse drive operating problems. In the event the crane operator uses the hydraulic foot brake to try to decelerate the bridge or trolley at a rate more rapid than set by the drive controller, the traverse drive and the foot brake "fight" one another.

This is so since the controller (with its pre-set rate of deceleration) will regulate the drive to decelerate "along the ramp," neither faster nor slower. If the hydraulic brake is very lightly applied, the controller will continue deceleration by regenerative braking, aided to a slight degree by the hydraulic brake. On the other hand, if the hydraulic brake is aggressively applied (and thus tries to slow the crane more rapidly than it would normally decelerate "along the ramp"), motor operation shifts from what is known as the regenerative quadrant to the motoring or driving quadrant. That is, the motor again starts driving the crane and "drives through" the hydraulic brake.

To again use the analogy of an automobile, the effect is like letting up on the vehicle accelerator at a relatively slow rate (regenerative braking) but applying the brakes with the other foot at a more aggressive rate. The vehicle engine (even though slowing) tries to drive the vehicle at a more rapid rate than is indicated by brake pedal pressure.

In an overhead crane, the overly-aggressive level of retarding torque which can be imposed by the hydraulic brake can severely stress and damage the electrical controller itself, the drive motor and/or the hydraulic brake. Overhead cranes represent substantial capital investments and their economic use depends in large part upon the ability to keep them working. In other words, "uptime" is critical and crane downtime can mean the difference between profitable and unprofitable operations. And repair components are expensive. A large bridge drive motor may cost several thousand dollars and weigh hundreds of pounds.

An improved method and apparatus for preventing dual braking in such material handling machines would be an important advance in the art.

OBJECTS OF THE INVENTION

It is an object of the invention to provide an improved method and apparatus which overcomes some of the problems and shortcomings of the prior art.

Another object of the invention is to provide an improved method and apparatus for preventing dual braking.

Yet another object of the invention is to provide an improved method and apparatus for preventing dual braking which helps avoid damaging traverse drive components.

Still another object of the invention is to provide an improved method and apparatus for preventing dual braking, thereby reducing machine maintenance and improving uptime of material handling machines. How these and other objects are accomplished will become apparent from the following descriptions and the drawing.

SUMMARY OF THE INVENTION

The invention is an improvement in a material handling machine such as an exemplary overhead travelling crane of the type having an electric motor and a motor controller configured to retard the machine by regenerative motor braking. The machine also has a manually-applied hydraulic brake which is also used for machine retarding and stopping.

An improved method for preventing dual machine-retarding braking (such as by simultaneous regenerative and hydraulic braking) includes the steps of applying the manual brake and modifying controller operation (by relay sequencing and the like) to prevent machine "motoring" while braking. In that way, the machine is retarded solely by application of the manually-operated brake when such brake is used as described below.

The brake application step includes providing a signal to the controller for modifying controller operation. Preferably, the signal is provided by "changing the state" of or switching the contacts of a relay from open to closed or closed to open. The manually-applied brake is a hydraulic brake and since braking effort is generally proportional to the hydraulic pressure in the brake line, it is convenient to provide the signal as a function of hydraulic pressure.

And very light application of the hydraulic brake during regenerative braking does not materially harm the electrical controller or the motor. However, as the hydraulic brake is applied more aggressively, system damage could occur. Therefore, in the preferred method, the aforementioned signal is provided after hydraulic pressure rises to a predetermined value as would result from a braking effort which may damage the system.

However, there are other ways in which to initiate a controller-modifying signal. One is to install what is known as a limit switch on the brake foot pedal and provide the signal as a function of pedal position. Another way involves an electrohydraulic, motor-coupled braking device having (as they do) at least one moving part. A limit switch or the like is mounted in motion-sensing relationship to the part and the signal is provided as a function of the position of the part.

The electrical controller includes what is known as a "fault" terminal. A change-of-state signal applied to the terminal has the effect of disabling controller operation until one or more subsequent events occurs. Therefore, in the preferred method, controller operation is modified by introducing a fault signal to the controller and, specifically, at the "external fault" input terminal.

As the machine is manually braked toward a relatively low speed (or stopped), the risk of damage because of motoring while braking or "driving throug the brake" diminishes. Therefore, the preferred method also includes the steps of generating a signal representing motor speed and restoring controller operation when the motor reaches a relatively low speed such as 5-10 rpm.

When controller operation is restored, there is the possibility that if the operator's master switch is then at some intermediate or high speed setting rather than at the neutral position, the crane could lurch and accelerate. A cable-suspended load would swing and possibly be damaged. Therefore, the operation-restoring step preferably includes, in either order, the steps of placing the speed control switch in the neutral position and generating a signal representing a relatively low motor speed. When the controller includes a reset terminal (at which a change-of-state signal "re-enables" the controller), the operation-restoring step further includes the step of providing a reset signal at the terminal.

Considering next the machine aspects of the invention, the improved machine includes signalling means for providing a fault signal to the external fault terminal upon manual application of the brake and after hydraulic pressure rises to a predetermined value. As explained above, such fault signal modifies controller operation to prevent the electric motor from driving through the brake when the hydraulic brake is being applied. The signalling means preferably includes a switch responsive to hydraulic pressure, a switch actuated as a function of pedal position or a switch actuated as a function of the position of the part on a motor-coupled braking device.

In the preceding explanation, an aspect of the method included generating a signal relating to motor speed. The improved machine includes a motor speed signal generator for the purpose. Such generator provides an oscillating signal at a frequency related to motor speed. A speed signal sensing relay is connected to the generator and includes a frequency divider.

The signal generator has a plate-like count disc rotating at motor speed and a plurality of openings arranged about the disc perimeter. In a highly preferred machine, the number of openings is 60 and one can set the sensing relay (which is adjustable) directly at the desired motor speed at which operation of the controller can be restored. This "direct-setting" capability helps avoid setting errors.

Further details of the invention are set forth in the drawing and the detailed description.

DETAILED DESCRIPTION OF PREFERRED EMBODIMENTS

Figure 1:
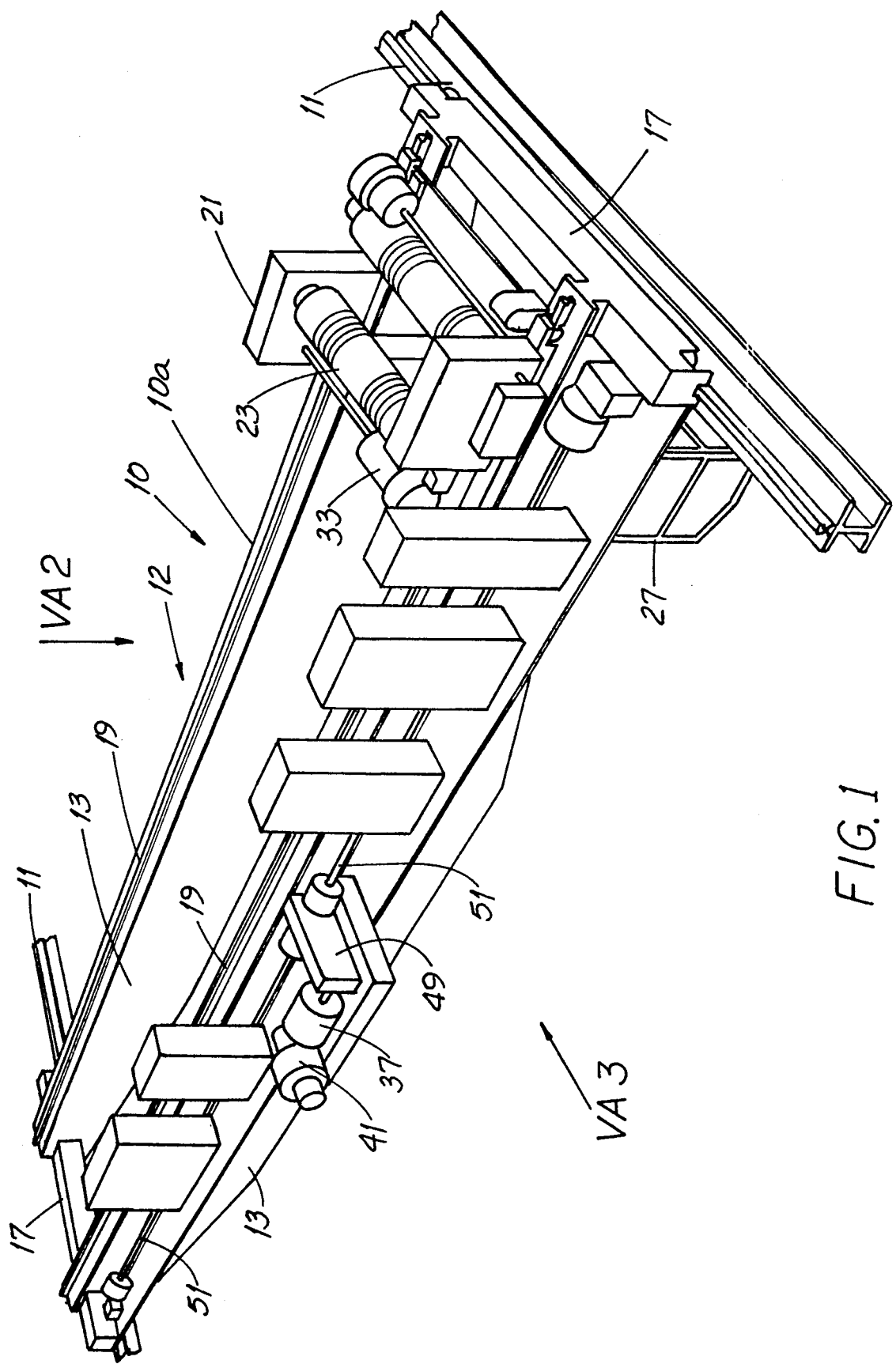
FIG. 1 is an isometric view of a representative overhead travelling crane.
Figure 2:
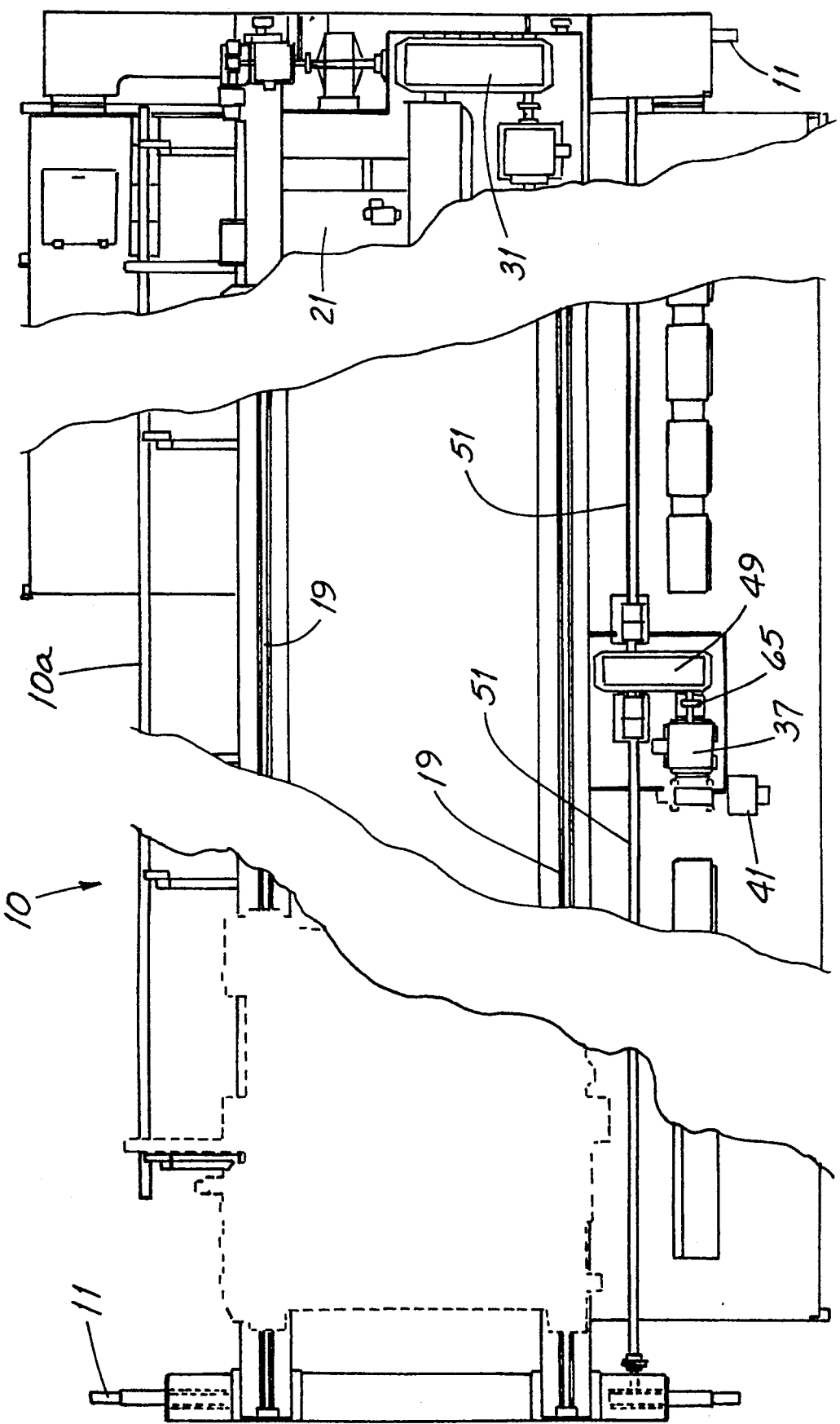
FIG. 2 is a top plan view of the crane of FIG. 1 taken along the viewing axis VA2 thereof and with parts broken away and other parts in dashed outline.
Figure 3:
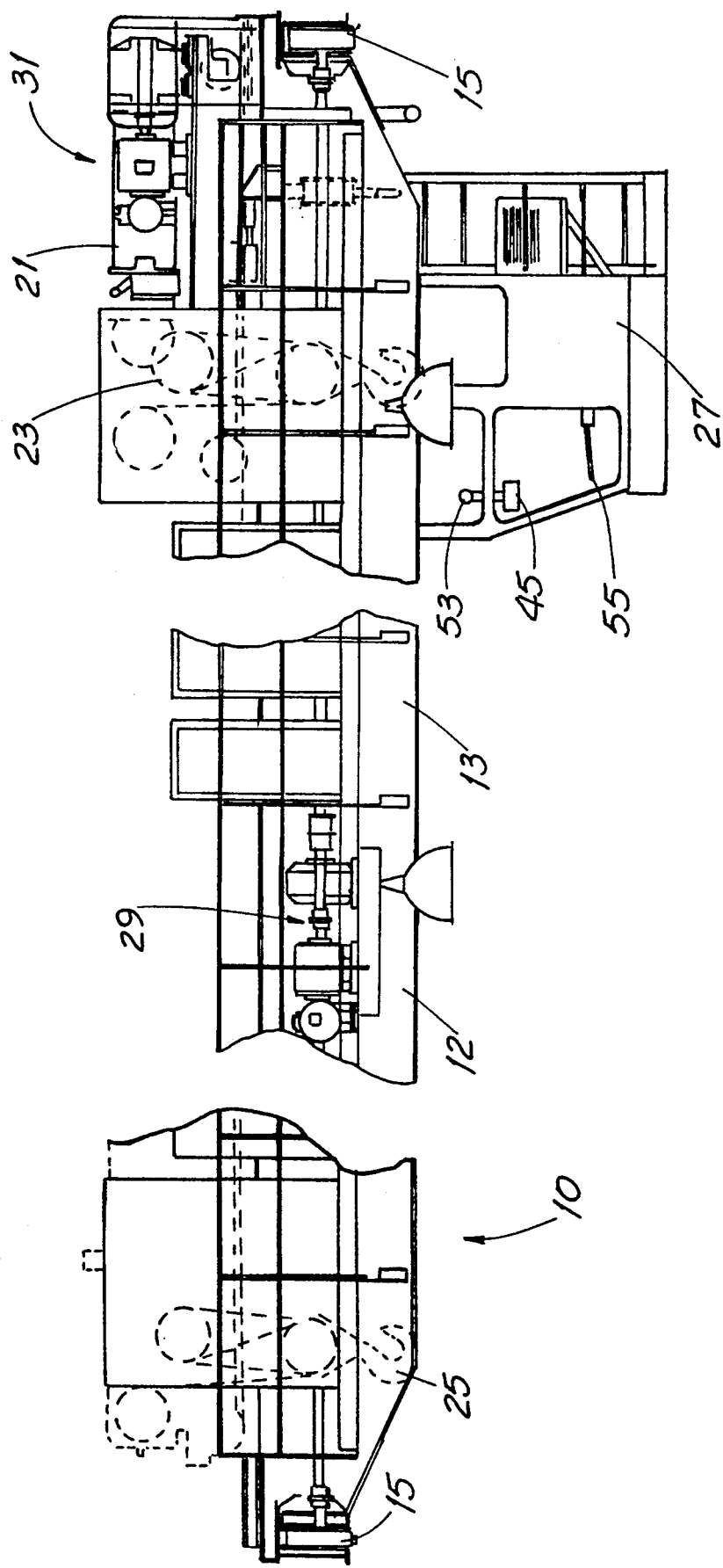
FIG. 3 is a side elevation view of the crane of FIG. 1 taken along the viewing axis VA3 thereof and with parts broken away and other parts in dashed outline.

Referring first to FIGS. 1-3, the improved method and machine 10 are described in connection with a material handling machine. In the illustrated example, the machine 10 is an overhead travelling crane 10 (OTC) which traverses along a pair of elevated main rails 11. The rails 11 are parallel and spaced apart, usually by several yards. A pair of bridge girders 13 extends between the rails 11 and define a bridge 12. There is a driven wheel 15 mounted in an end truck 17 at either end of the girders 13 for riding atop the rails 11. And the girders 13 themselves have rails 19 on them.

A substructure called a "trolley" 21 is mounted on the girder rails 19 and traverses the width of the bridge under motive power. A load hoist 23 is mounted on the trolley 21 and includes a powered hoist/lower "rope drum" or drums about which steel cable is spirally wrapped. The cable is connected to a load-lifting hook 25, sling, bucket, magnet or the like. With the foregoing arrangement, the operator (who rides in the cab 27 which is attached to and moves with the bridge 12) can pick up, move and deposit a load anywhere in the area travelled by the crane 10a.

An exemplary overhead crane 10a employs two electric-motor traverse drive systems 29, 31, one each for the bridge and trolley traverse drives, respectively. A third electric-motor drive system 33 is used for hoisting and lowering loads. The invention will be described with respect to the bridge drive 29 but it should be understood that such invention is applicable on other types of drive systems and other types of material handling machines.

Figure 4:
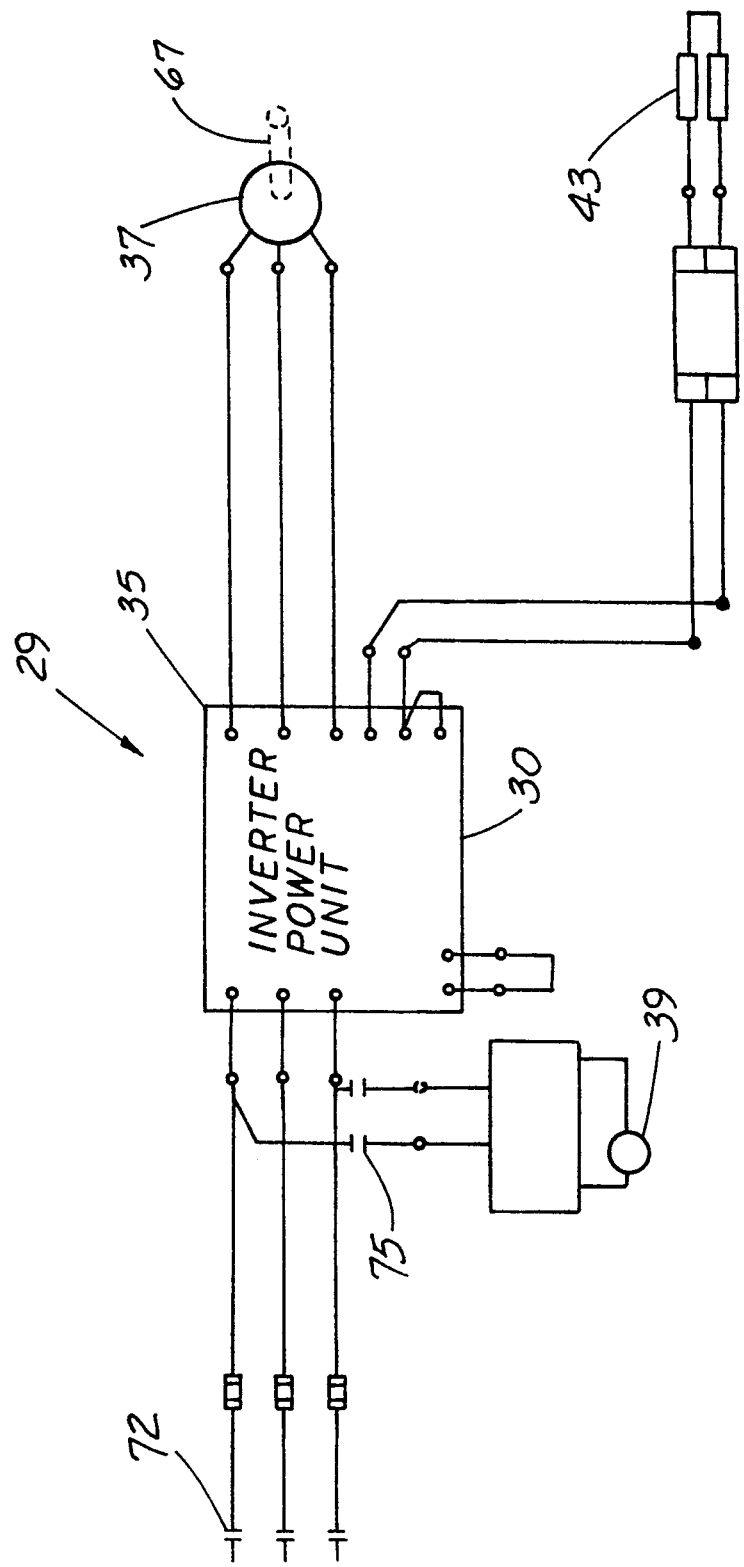
FIG. 4 is a simplified schematic diagram of the electrical circuit relating to the bridge drive system of the crane shown in FIGS. 1-3 and with part shown in dashed outline.

Referring additionally to FIG. 4, the bridge traverse drive system 29 includes an adjustable frequency control unit 35, a bridge drive motor 37, a brake-release coil 39 for the bridge brake 41 described below and a set of dynamic braking resistors 43. In general, the unit 35 is under control of an operator manipulating a master switch 45 located in the crane cab 27.

Figure 5:
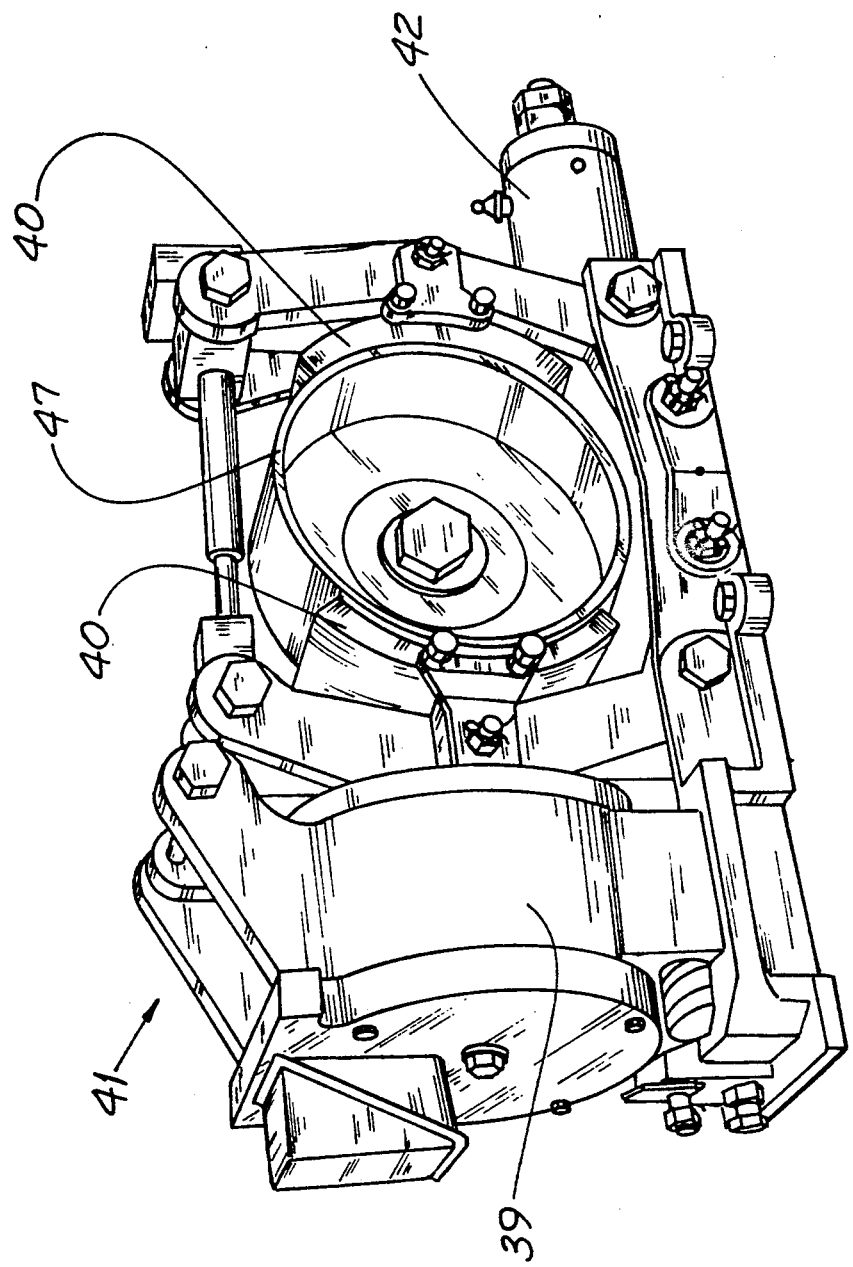
FIG. 5 is an isometric view of an electrohydraulic brake of the type used on the bridge and trolley traverse drives of the crane shown in FIGS. 1-3.

In the illustrated embodiment, the bridge drive motor 37 is an AC squirrel cage motor having its shaft protruding from either end. As shown in FIG. 5, a brake wheel 47 is mounted on one end of the shaft and an electrohydraulic brake 41 mounted with the wheel 47 in a known way. Absent an electrical current flowing in the coil 39, the brake 41 is spring set to clamp the wheel 47 and prevent bridge movement. Upon crane startup, the coil 39 is energized and the brake 41 releases to permit free rotation of the wheel 47. Thereafter, the brake shoes 40 can be applied to the wheel 47 by a hydraulic cylinder 42, much in the same way as one applies brakes on an automobile.

As best seen in FIGS. 2 and 3, the other end of the motor shaft is connected to a "step down" or speed reducing gear box 49 and thence to a line shaft 51 extending from either side of the box 49. The line shafts 51 are driven by the motor 37 but at a much lower rotational speed. Each line shaft 51 drives a wheel 15 mounted on an end truck 17 at each end of the machine 10.

Even with no load on the hoist 23, overhead cranes are very heavy. And with a crane-suspended load, the total weight can be much greater. The crane operator requires a way to retard bridge motion in a controlled manner without constantly using the hydraulic brake. Therefore, AC drive systems often include the resistor bank 43 shown in FIG. 4. For retardation, the kinetic energy of the moving bridge 12 is dissipated in the resistors 43 as heat. The effect is to retard the bridge traverse drive motor 37 (and, thus, the bridge 12 itself) at a rate much more rapid than would occur simply by letting the bridge 12 coast to a stop. And when a crane 10a is turned off (at the end of a shift, for example), the spring-set brake 41 clamps the brake wheel 47 and prevents drive motor rotation.

More specifically, the bridge traverse drive 29 is operated by the master switch 45 which has a handle 53 with a neutral position (shown in FIG. 6B) and a continuum of positions in each of two directions from neutral. Such an arrangement is often referred to as "proportional control" in that there are an infinite number of handle positions available and speed is proportional to the position of the handle 53. The handle 53 thus controls bridge drive speed in each of two directions. And the farther the handle 53 is moved away from the neutral position, the faster the traverse drive 29 moves the bridge 12.

Regenerative braking occurs whenever the actual speed of the bridge traverse drive 29 is greater than the speed then "set" by the master switch handle 53. Such a condition could occur when the operator runs the bridge 12 at full speed down the rails 11 and then starts to retard bridge speed by moving the handle 53 towards neutral. And in that event, the electric motor 37 and control unit 35 "ramp down" or decelerate the speed of the bridge 12 to the set speed. The quoted expression derives its name from the fact that when depicted on a two-axis graph, the straight line representing velocity plotted against time has a slope (which represents the rate of deceleration) and is therefore ramp-like in shape. Usually, the control manufacturer sets the rate of deceleration—it is not often changed in day-to-day crane operations.

Regenerative braking is not the only means available to retard bridge motion. An electrohydraulic brake 41 (as described above) is coupled to the crane bridge traverse motor 37. The brake 41 has a hydraulic cylinder 42 actuated by a foot pedal 55 in the cab 27. Pressurizing the cylinder 42 applies the brake notwithstanding mechanical release of certain brake linkages by the energized coil 39. As with an automobile, the operator can depress the foot pedal 55 and brake 12 the bridge at a rate selected by pedal foot pressure. And sometimes (indeed, very often in certain types of material handling operations) the operator must retard the bridge 12 and brake it to a stop in a much shorter time than would result from the use of regenerative braking alone. It might be said that the operator then needs a rate of deceleration with a steeper slope.

When decelerating using hydraulic braking, the operator may intentionally or inadvertently leave the master switch 45 set at some point other than neutral while at the same time applying brake pedal pressure resulting in a related pressure in the cylinder 42. Such a circumstance is generally analogous to applying the brakes of an automobile while keeping one's foot on the accelerator. The retarding torque imposed by the hydraulic brake 41 can severely stress the inverter power unit 30 (electrical stress) and the drive motor 37, gear box 49, line shaft 51 and the brake 41 itself. The inventive method and apparatus eliminate this possibility.

Upon application of the hydraulic brake 41 with force sufficient to create a predetermined pressure in the cylinder 42, e.g., 35 p.s.i., the operation of the control unit 35 is modified by disabling it. Such unit 35 continues disabled until the drive motor 37 reaches a predetermined relatively low speed and until the operator "centers" the master switch handle 53 at neutral. That is, in a highly preferred embodiment, both conditions must co-exist for the inverter power unit 30 and the control unit 35 to again become operable to apply a voltage to the drive motor 37.

Referring to FIGS. 2, 6A, 7 and 8, detection of motor speed is by a sensor assembly 57 including a frequency-sensitive relay 59, a disc 61 and a sensor head 69. The edge of the flat, circular disc 61 is perforated with a number of equally-spaced holes 63. The disc 61 is mounted at the coupling 65 and concentric with the motor shaft 67 and rotates at the same speed as the motor shaft 67. The bracket-supported sensor head 69 is mounted in close but non-contacting proximity to the disc 61 so that as the disc 61 rotates, the head 69 is in registry with each hole 63 as it passes the head 69.

Each time a hole 63 passes the head 69, the head 69 generates a pulse which is directed to the relay 59. The relay 59, of a known type, is adjustable and includes counting and timing circuits and when the motor 37 reaches a predetermine low speed, 5-10 rpm for example, the relay 59 "switches" to re-enable the control unit 35. In a highly preferred configuration, the disc 61 has 60 holes so that when the relay 59 "counts," say, 360 pulses over a period of one minute (which is equal to 6 pulses per second or 6 Hz), this is interpreted to equate to a motor speed of 6 rpm. Such speed is sufficiently low to permit the unit 35 to be re-enabled and system operation to resume, assuming the master switch handle 53 is then set at neutral.

Figure 6A:
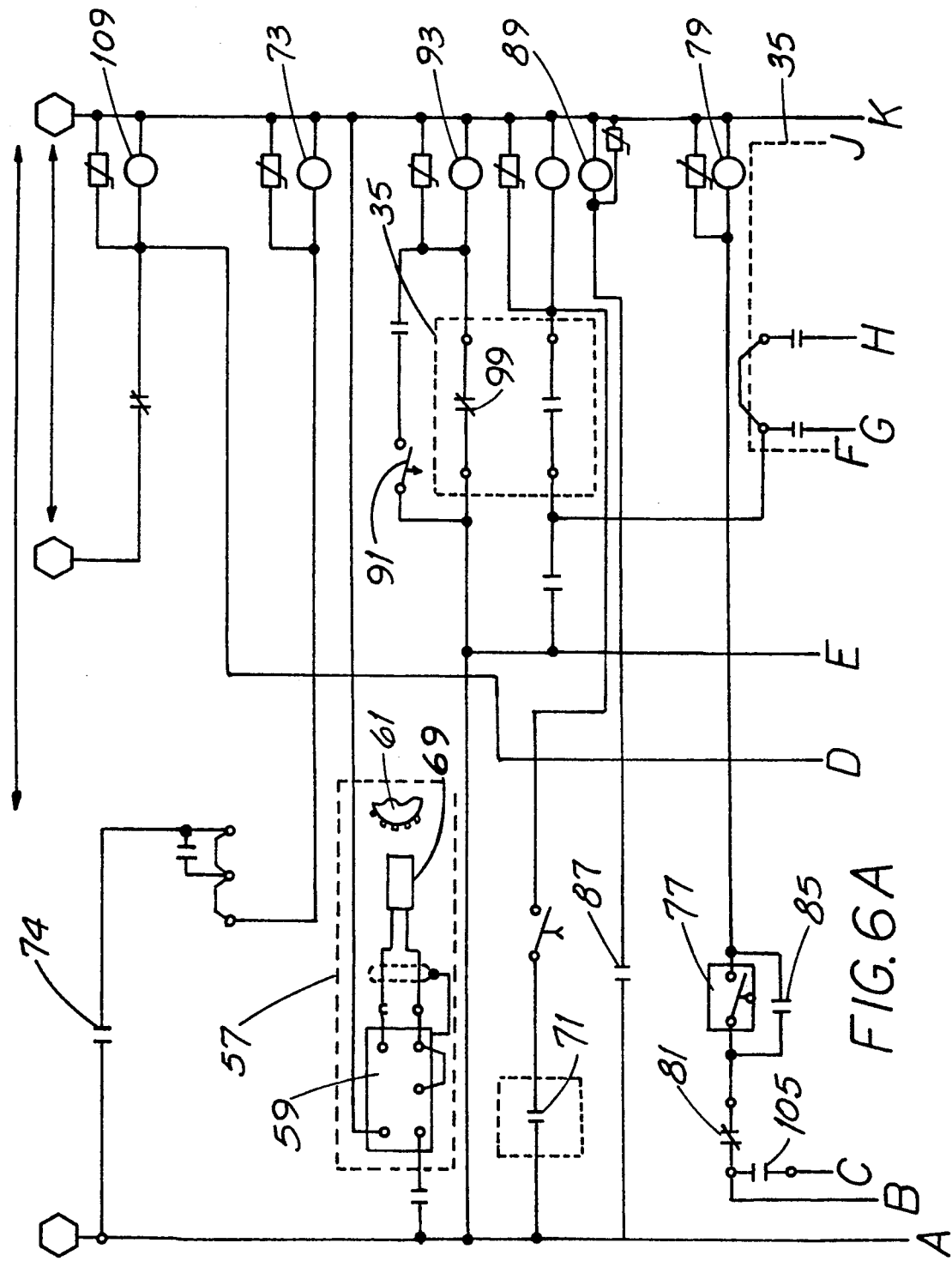
FIGS. 6A and 6B, taken together along the match lines, show the control circuit for the bridge traverse drive system of FIG. 4.
Figure 6B:
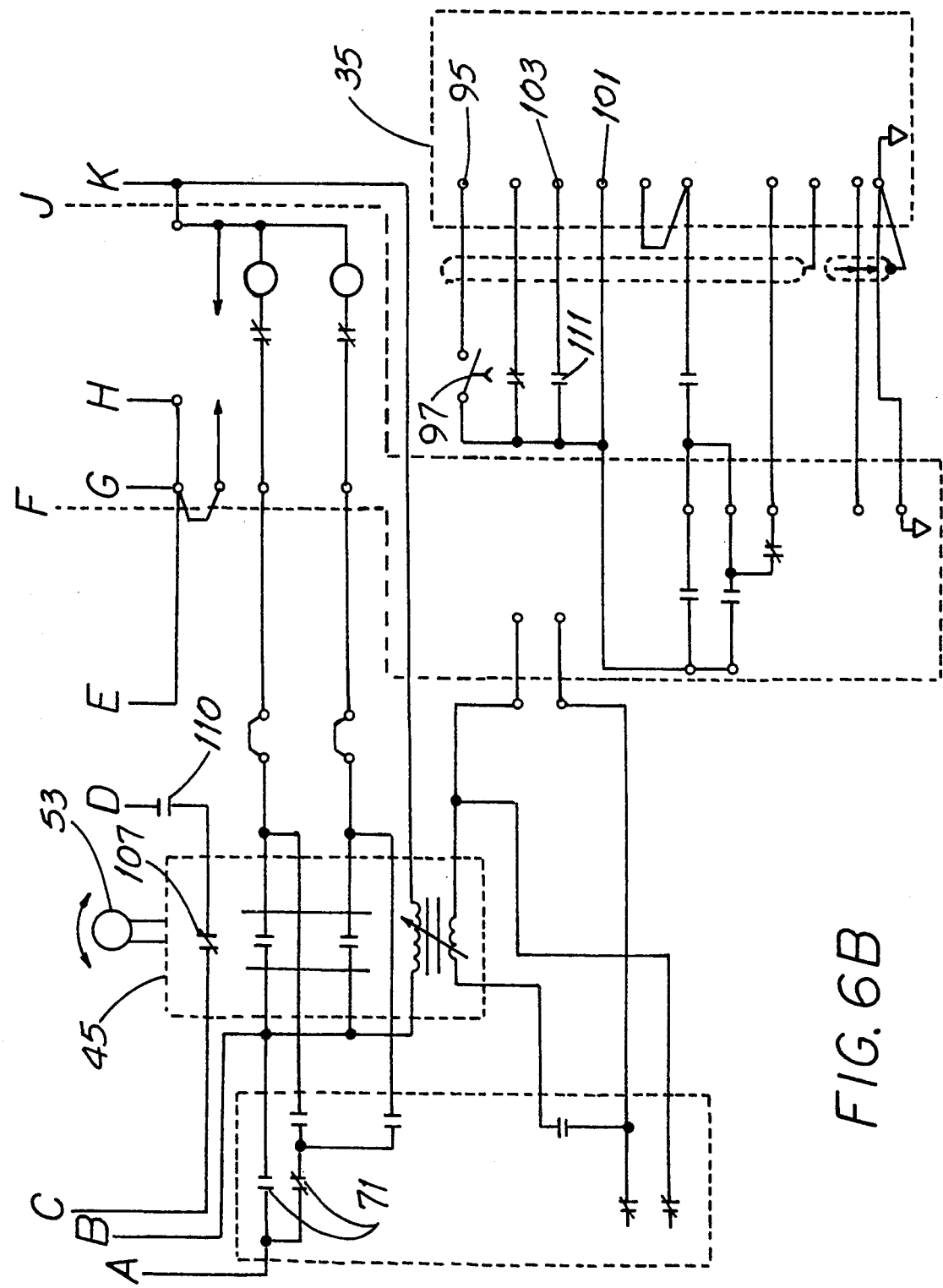
Figure 7:
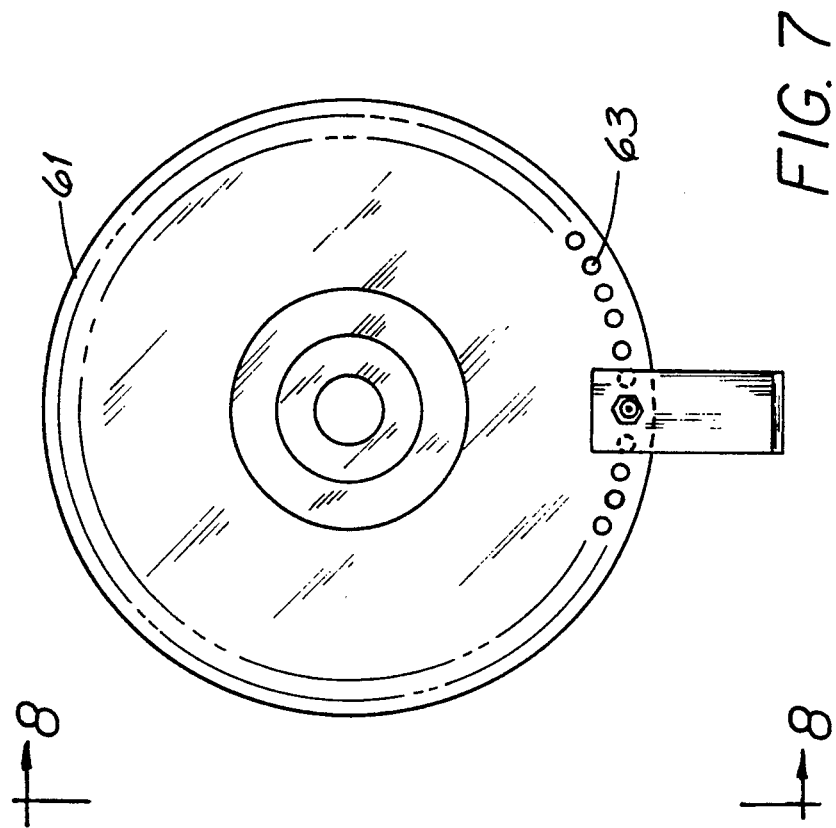
FIG. 7 is an elevation view of a perforated disc and a pick-up sensor used to detect the speed of an exemplary bridge drive motor. Parts are shown in dashed outline and the view is taken along the rotational centerline axis of the drive motor shaft.
Figure 8:
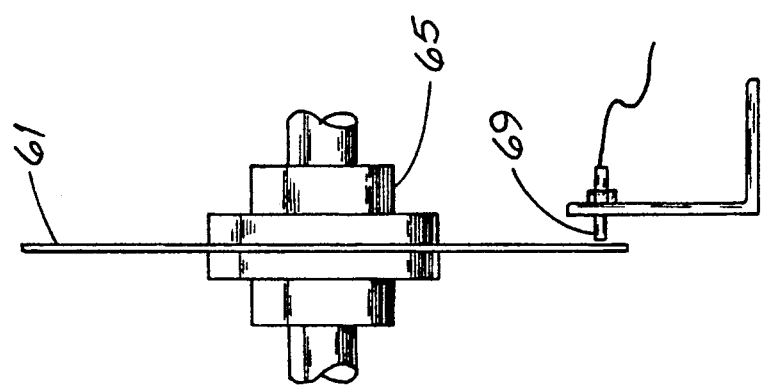
FIG. 8 is a side elevation view of the disk and sensor shown in FIG. 7, taken along the viewing plane 8—8 thereof.

Referring to the FIGURES and, particularly, to FIGS. 4, 6A and 6B, the circuit diagram shown in FIGS. 6A and 6B is for an OTC 10a equipped for operation from the cab 27 or by radio remote control. In operation, the radio/cab transfer switch 71 is placed in the "cab" position (if not already there) and the START button is pressed. This energizes the main line contactor and closes its contacts 72. The enable relay 73 is energized through a set of auxiliary contacts 74 on the main line contactor and such contacts 74 close simultaneously with closure of contacts 72 after pressing the "start" button. The brake contactor 75 closes to energize the coil 39 and release the brake 41.

After the crane 10a has been started (and subject to exceptions including a "fault" or a power failure), braking is either by regenerative braking or by depressing the hydraulic brake pedal 55 to actuate the brake hydraulic cylinder 42.

Depressing the hydraulic brake foot pedal 55 increases the pressure in the brake cylinder 42 and the brake starts to engage the brake wheel 47. When cylinder pressure reaches about 35 psi on increasing pressure, the pressure-sensing brake switch 77 closes. Closure of switch 77 energizes the brake switch timing relay 79 through the normally-closed contacts 81 of the relay 59. The contacts 81 are closed and remain closed as shown as long as the speed of the motor 37 is greater than about 5-10 rpm. The timing relay 79 (which is energized on closure of the switch 77), also has two sets 85, 87 of normally open/instantaneous close contacts. One set 85 causes the relay 79 to "latch" itself in the energized state and the other set 87 closes and energizes the zero speed timing relay 89.

The relay 89 has an instant-close, timed-open contact 91 that closes to insure that the fault relay 93 will remain energized when the hydraulic brake 41 is being applied. Absent such contact 91, the relay 93 would become de-energized when the system "faults" due to the input at the "external fault" terminal 9 resulting from timed closure of the contact 97 of relay 79 at terminal 95 and the resulting opening of contact 99. The relay 79 is adjusted for a time lapse prior to closure of the contacts 97 which is of sufficient duration to assure that the relay 93 is "sealed in" before the contact 97 would otherwise invoke an "external fault."

Connecting the terminals 95 and 101 (by closure of relay contacts) signals an "external fault" to the control unit 35 which shuts off or disables its output. Operation can be resumed only after an external reset signal is applied to the "fault reset" terminal 103. When the unit 35 is disabled by application of the hydraulic brake 41, bridge deceleration is entirely controlled by the operator depressing the pedal 55. To put it another way, the control unit 35 "ignores" all directional and speed control signals from the master switch 45 until the speed of the motor 37 has decreased to the value, e.g., 5–10 rpm, preset at the relay 59.

The relay 59 is adjusted to "change state" (contact 105 changes from open to closed and contact 81 changes from closed to open) at a decreasing motor speed within the range indicated above. When the motor speed drops to about 5–10 rpm, the contact 81 opens to de-energize the relay 79. The timed-open contact 91 of the relay 89 delays opening the circuit to the fault relay coil 93 until the control unit 35 (and, specifically, its microprocessor) is fully reset.

When the contact 105 closes (and assuming the master switch handle 53 in the neutral position and its contact 107 therefore closed, the reset relay 109 is energized through the fault relay contact 110. Closure of contact 111 of relay 109 connects the "common" terminal 101 to the reset terminal 103 and the control unit 35 is reset to resume normal operation. With the control unit 35 reset, the contact 99 (which opens on a fault including a fault intentionally "created" by the invention) closes to maintain the relay 93 in the energized state.

While the inventive method and machine 10 have been shown and described in connection with specific embodiments, it should be clearly understood that these are merely exemplary and that variations are possible without departing from the invention.

I claim:

1. In a material handling machine having (a) an electric motor powering driven wheels and a motor controller configured to retard the machine by regenerative motor braking and (b) a hydraulic braking system having a manually-applied hydraulic brake for retarding the machine, an improved method for preventing machine "motoring" while braking including the steps of:
providing a sensor assembly emitting pulses during rotation of the motor;
operating the hydraulic brake and thereby immediately applying hydraulically-powered braking torque to the driven wheels;
detecting the pulses to generate a signal representing motor speed;
detecting a predetermined hydraulic pressure in the hydraulic braking system;
disabling controller operation upon detection of the predetermined hydraulic pressure, such disabling being by changing the state of contacts connected to the controller to prevent the motor from driving through the brake; and,
restoring controller operation when the motor reaches a relatively low speed,
whereby the machine is retarded solely by the manually-operated brake.

2. The method of claim 1 wherein the manually-applied hydraulic brake includes a foot pedal and the contact change of state is a function of the pedal position.

3. The method of claim 1 wherein the manually-applied hydraulic brake includes a motor-coupled braking device with at least one moving part and the contact change of state is a function of the position of the part.

4. The method of claim 1 wherein changing the state of contacts introduces a fault signal to the controller.

5. The method of claim 1 wherein the machine includes a manually operated speed control switch having a neutral position and the operation-restoring step includes, in either order, the steps of:
placing the speed control switch in the neutral position; and,
generating a signal representing a relatively low motor speed.

6. The method of claim 5 wherein the controller includes a reset terminal and the operation-restoring step further includes the step of providing a reset signal at the terminal.

7. In a material handling machine including (a) a motor, (b) a motor controller configured to retard the machine by regenerative motor braking and having a fault terminal and a reset terminal, and (c) a manually-applied hydraulic brake for retarding the machine, the improvement comprising:
a first relay responsive to a pressure-actuated switch for providing a controller-disabling fault signal to the fault terminal upon manual application of the brake;
a sensor assembly emitting pulses during motor rotation;
a pulse-receiving relay for determining motor speed; and,
contacts actuated by the pulse-receiving relay for providing a signal to the reset terminal when the motor speed has decreased to a predetermined speed,
whereby the controller operation is disabled to prevent the motor from driving through the brake and is subsequently restored when the motor speed has decreased to the predetermined speed.

8. The machine of claim 7 wherein the fault signal is provided after hydraulic pressure if the brake rises to a predetermined value.

9. The machine of claim 7 wherein the brake includes a foot pedal and the switch is actuated as a function of the pedal position.

10. The machine of claim 7 wherein the manually-applied hydraulic brake includes a motor-coupled braking device with at least one moving part and the first relay is actuated as a function of the position of the part.

11. The machine of claim 7 wherein the sensor assembly emits pulses at a frequency related to the motor speed; and,
the pulse-receiving relay includes a pulse counter.

12. The machine of claim 11 wherein the sensor assembly includes a plate-like count disc rotating at the motor speed and having a plurality of openings therethrough and the pulse-receiving relay counts the number of pulses per second.

13. In a material handling machine having (a) an electric motor and a motor controller configured to retard the machine by regenerative motor braking, (b) a manually-applied brake for retarding the machine, and (c) a manually operated speed control switch having a neutral position, an improved method for preventing machine "motoring" while braking including the steps of:
applying the manual brake;
generating a signal representing the motor speed;
disabling the controller operation to prevent the motor from driving through the brake; and,
restoring the controller operation when the motor reaches a relatively low speed;
and wherein the operation-restoring step includes, in either order, the steps of:
placing the speed control switch in the neutral position; and, generating a signal representing a relatively low motor speed.

14. The method of claim 13 wherein the controller includes a reset terminal and the operation-restoring step further includes the step of providing a reset signal at the terminal.

15. In a material handling machine including (a) a drive motor, (b) a motor controller configured to retard the machine by regenerative motor braking and having a fault terminal, and (c) a manually-applied brake for retarding the machine, the improvement comprising:

a motor speed signal generator coupled to the motor and providing an oscillating signal at a frequency related to the motor speed;

a speed signal sensing relay coupled to the generator and including a pulse counter; and, signalling means for providing a fault signal to the terminal upon manual application of the brake, whereby the controller operation is disabled to prevent the motor from driving through the brake and the controller operation is restored at a relatively low motor speed.

16. The machine of claim 15 wherein the signal generator includes a plate-like count disc rotating at the motor speed and having a plurality of openings therethrough and the sensing relay counts the number of pulses per unit time.

* * * * *